United States Patent [19]

Warrener

[11] 3,804,446

[45] Apr. 16, 1974

[54] SHOCK ABSORBING BUMPER MOUNT
[75] Inventor: Paul H. Warrener, Jamestown, Ohio
[73] Assignee: Sherman Universal Corporation, Indianapolis, Ind.
[22] Filed: Sept. 27, 1972
[21] Appl. No.: 292,603

[52] U.S. Cl................. 293/88, 293/89, 293/70, 188/1 B, 267/9 C
[51] Int. Cl................ B60r 19/06, F16f 11/00
[58] Field of Search........... 293/1, 71 P, 85, 88, 89, 293/70; 267/9 B, 9 C, 65 R; 188/1 B, 129

[56] References Cited
UNITED STATES PATENTS

| | | | |
|---|---|---|---|
| 2,373,508 | 4/1945 | Snyder | 267/9 C |
| 3,459,441 | 8/1969 | Hornsby | 267/65 R |
| 2,844,366 | 7/1958 | Butterfield | 188/129 |

Primary Examiner—Gerald M. Forlenza
Assistant Examiner—Robert Saifer
Attorney, Agent, or Firm—Trask, Jenkins & Hanley

[57] ABSTRACT

A shock absorbing bumper mount provided with a cylinder adapted to be mounted on an automotive vehicle and having a piston slidably carried therein and projecting outwardly therefrom for connecton to a bumper. An inflated bag is carried within said cylinder in bearing engagement with a conical slide. An elastomeric sleeve is slidably carried in said cylinder and is interposed between the apex of said slide and the adjacent end of said piston whereby upon movement of said piston toward a retracted position said sleeve will bear against the slide tending to cause said slide to compress the bag and to cause said sleeve to scrub against the interior cylinder wall to thus absorb the energy forcing the piston to retracted position.

11 Claims, 4 Drawing Figures

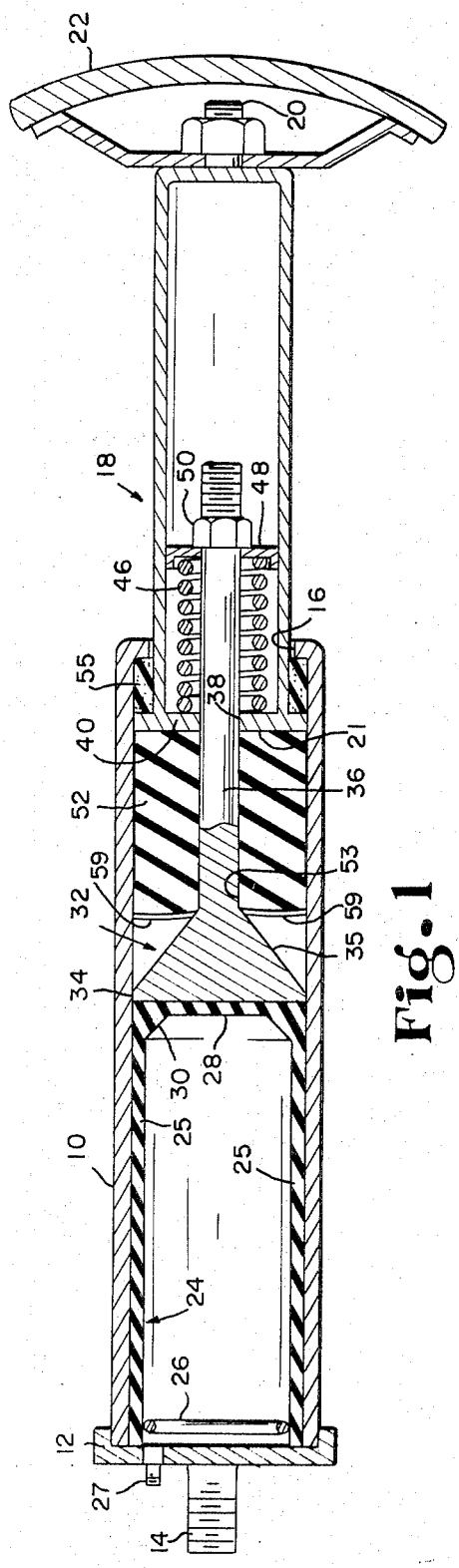
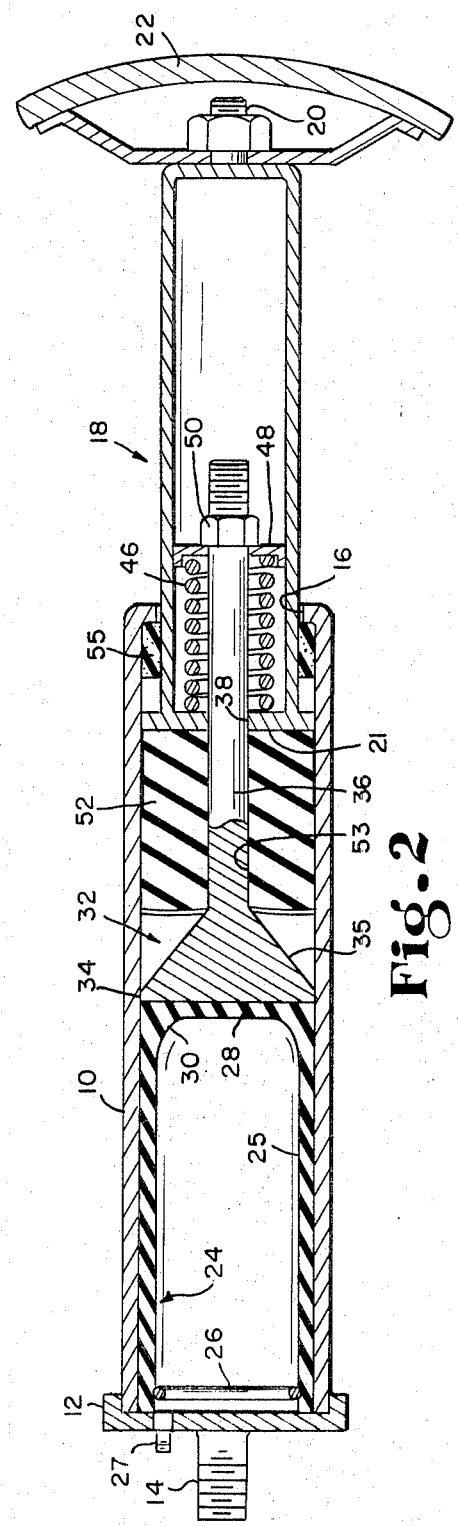

SHOCK ABSORBING BUMPER MOUNT

BACKGROUND OF THE INVENTION

Energy absorbing bumper mounts for automotive vehicles are well known in the art. The obvious function of such supports is to absorb the energy imparted to the bumper upon its impact with an object, such as another automotive vehicle, a wall, or the like. Examples of such mounts are disclosed in U.S. Pat. Nos. 2,990,659, 3,144,357, 2,555,436 and 3,432,200.

Many of the energy absorbing supports in the prior art have employed inflated bags, spring loaded piston and cylinder assemblies, and combinations of said bags and piston cylinder assemblies. Such prior art devices have performed well when the bumpers to which they are connected are subjected to minor impact forces but they have not been able to withstand larger impact forces which are often encountered in accidents of a character in which a vehicle is moving at a speed greater than 5 mph. In addition, many of these prior art devices have required that they be reset into an operative position after they have been subjected to an impact force.

It is thus an object of the instant invention to provide an energy absorbing bumper mount for an automotive vehicle which will overcome the difficulties and disadvantages of the prior art devices discussed above. More specifically, it is an object of the instant invention to provide such a support which will easily absorb the impact forces imparted to an automotive vehicle irrespective of whether such force be of lesser or greater magnitude, which will automatically return to a preset operative condition after it has absorbed an impact force, and which will prove sturdy and durable in use.

SUMMARY OF THE INVENTION

In accordance with one form of the invention, there is provided a cylinder adapted to be mounted on an automotive vehicle frame and slidably supporting a piston adapted to be connected to the bumper of said vehicle. An inflated bag is mounted within said cylinder adjacent its end opposite said piston. Said bag is disposed in bearing engagement with a generally conical slide operatively connected to said piston for movement therewith. An elastomeric sleeve is interposed between said slide and piston within said cylinder. Said sleeve is positioned and proportioned such that it is slidable within the cylinder and is disposed in bearing engagement with said piston and the apex of said slide.

Thus, when an impact force is imparted to a bumper, the force will be transmitted through the piston, sleeve, and slide, to the bag. If the force is less than the force exerted on the slide by said bag, substantially all of said force will be absorbed by the bag. If, on the other hand, said force is greater than the force of the bag against the slide, the bag will be partially collapsed, and the sleeve will be forced up over the conical face of the slide causing the outer circumference of said sleeve to scrub against the inner cylinder wall. In this manner, the bag and sleeve operate in combination with each other to absorb the impact force imparted to the bumper. When said impact force is released, the bag, acting through the slide and sleeve, will force the piston, and thus the bumper carried thereby, to their full extended operative position.

BRIEF DESCRIPTION OF THE DRAWINGS

The accompanying drawings illustrate the invention. In such drawings:

FIG. 1 is a longitudinal section of a shock absorbing bumper mount embodying the invention, and showing a bumper mounted thereon;

FIG. 2 is a longitudinal section of the mount shown in FIG. 1, but showing said mount in its retracted position;

DETAILED DESCRIPTION OF THE PREFERRED EMBODIMENT

Figure 3:
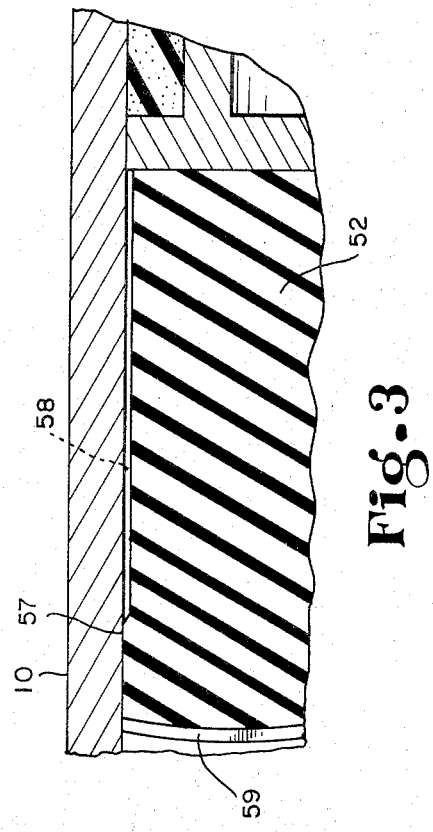
FIG. 3 is enlarged fragmentary longitudinal section showing the scrubbing action of the sleeve against the cylinder wall.

As shown in the accompanying drawing, the support comprises a cylinder 10 having an end cap 12 mounted on one of its ends. A threaded stud 14 projects outwardly from the end cap 12 for mounting said cylinder on the frame of an automotive vehicle. The end of the cylinder opposite the end cap 12 has an opening 16 formed therein in which a hollow piston 18 is slidably received. Said piston projects outwardly from the cylinder 10 and has a threaded stud 20 mounted on its outer end for connecting said piston to a bumper 22. As shown, the piston end has expanded head 21 slidably received against the inner walls of the cylinder.

An elongated inflatable bag 24 is carried within cylinder 10. The open end of said bag is disposed adjacent the end cap 12, and the side walls of said bag are retained in sealing engagement with the adjacent cylinder wall by an annular tension spring 26. In order to inflate bag 24, a conventional air valve 27 is mounted in end cap 12 in open communication with said bag. As shown, when the bag 24 is inflated, its end wall 28 lies in a plane normal to the axis of cylinder 10. Desirably, the juncture of the bag side and end walls 25 and 28 is thickened, as at 30, thereby helping to retain the wall 28 normal to the axis of the cylinder 10 during the compression and expansion movements of said bag as will be more fully explained hereinafter.

A generally conical slide 32 is movably carried within the cylinder 10. As shown, said slide has a cylindrical base section 34 slidably engagable with the inner wall of cylinder 10 and is disposed in bearing engagement with the bag end wall 28. A conical section 35 is integrally joined to said base section and is provided with an elongated pilot shaft 36 projecting outwardly from its apex. The shaft 36 is slidably received in an opening 38 formed in the head 21 of piston 18 for reception in said piston. A coil spring 46 is carried on the shaft 36 between the piston head 21 and a retainer cap 48 adjustably mounted on said shaft as by a nut 50 received on the threaded outer end of said shaft.

A cylindrical sleeve 52 formed from an elastomeric material is slidably carried in cylinder 10 between the slide 32 and piston head 21. As shown, said sleeve has an axially extending opening 53 formed therein through which the pilot shaft 36 extends. As will be understood, with spring 46 bearing against the retainer cap 48, the shaft 36 will thus cause the slide 32 adjacent the apex of its conical section 35 to be disposed in bearing engagement with the adjacent portion of the sleeve opening 53. This further causes the opposite end of sleeve 52 to be retained in abutting face to face engagement with the piston head 21.

With the support shown in its extended condition, as illustrated in FIG. 1, the slide 32 will be seated in the sleeve opening 53 under the action of the spring 46 and bag 24. The bag 24 bearing against said slide also causes said slide acting through the sleeve 52 to retain the piston 18 in its extended position. As shown, a seal 55 is fixedly mounted in the cylinder 10 between the piston head 21 and the cylinder end to cushion the outward movement of said piston and to prevent dirt and moisture from entering the cylinder through its opening 16.

The components of the mount will remain in their extended positions as illustrated in FIG. 1 until an impact force greater than the normal or at rest force exerted by the bag 24 against slide 32 is applied to the bumper 22. With the mount components in the extended positions shown in FIG. 1, the bag 24 and spring 46 cause the slide 32 to move against the sleeve 52. This causes the outer circumference of said sleeve at the end of the sleeve adjacent said slide to bear against the inner cylinder wall. Thus, as shown in FIG. 3, with the mount components in their extended positions, the axially extending portion 57 of outer circumference of the sleeve is in bearing engagement with the inner cylinder wall while the remaining portion of the sleeve's outer circumference is slightly spaced from said wall.

When an impact force is imparted to the bumper, the piston 18 moves to the left as viewed in FIG. 1. Such movement causes a corresponding movement to the left of the sleeve 52 and slide 32 tending to compress the bag 24. As the sleeve is moved, its outer circumference scrubs against the inner cylinder wall and increases the axial length of the sleeve portion 57 bearing against the cylinder wall. Thus, as shown in dotted line at 58 in FIG. 3, the axial length of portion 57 bearing against the cylinder wall increases substantially when an impact force is applied to the bumper. This increases the scrubbing action of the sleeve against the cylinder wall to help absorb the energy of the impact force. As the bag is further compressed, the slide 32 moves slightly farther into the sleeve opening 52 to further help increase the scrubbing action of the sleeve against the cylinder wall.

When the impact force is released, the piston 18, sleeve 52, and slide 32 will be moved back into their extended positions as illustrated in FIG. 1 under the pressure of the bag 24. In the event that the bag 24 loses its pressure, all of the energy of the impact force will be taken up by the scrubbing action of the sleeve 52 against the cylinder wall, the sleeve portion 57 being retained against the cylinder wall by reason of the spring 46 forcing the slide 32 into the sleeve opening 52.

In order to help insure that the sleeve portion 57 is disposed in bearing engagement with the cylinder wall even when the mount components are in their retracted positions shown in FIG. 1, a plurality of radially extending slits 59 are formed in the sleeve face adjacent the bag 24. This increases the deformability of the end of the sleeve engaging the slide 32 to thereby insure that the bag 24 and/or spring 46 will cause the slide to force the sleeve portion against the cylinder wall.

Figure 4:
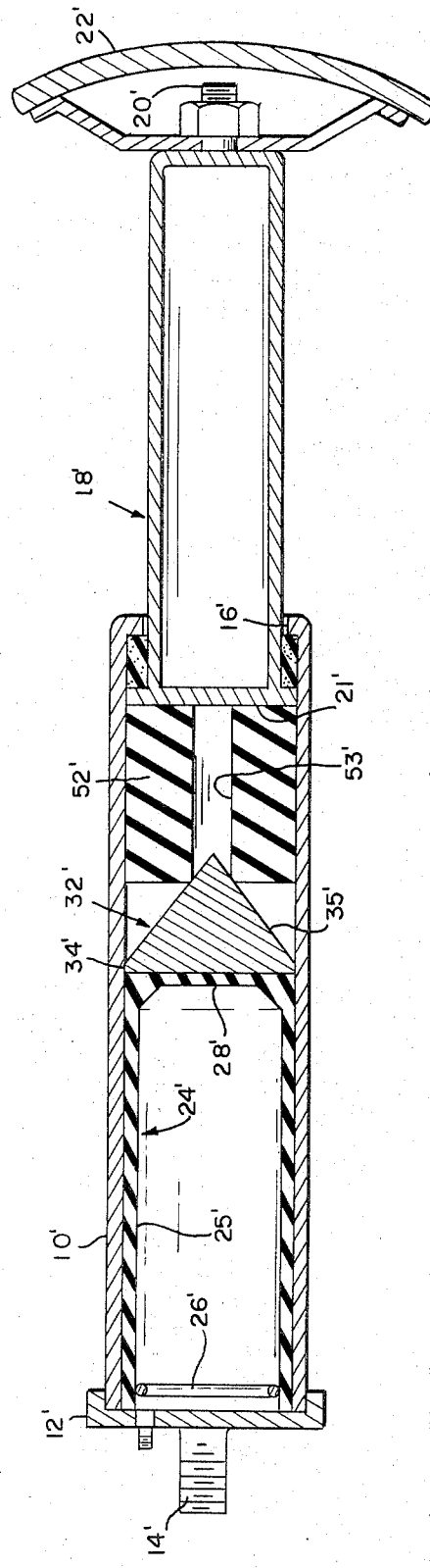
FIG. 4 is a longitudinal section similar to FIG. 1, but showing a modified form of the invention.

The embodiment of the invention illustrated in FIG. 4 differs from the embodiment illustrated in FIG. 1 solely in the elimination of the biasing spring action of the slide against the sleeve. Thus, said embodiment comprises a cylinder 10' closed at one of its ends by an end cap 12' having a threaded stud 14' for connecting the mount to an automobile frame. A piston 18' is slidably received in an opening 16' in said cylinder and is provided at its outer end with a threaded stud 20' adapted to be connected to a bumper 22'.

An inflated bag 24' is carried in the cylinder 10' with its side walls 25' disposed in sealing engagement with the inner cylinder wall by an annular tension spring 26'. The end wall 28' of bag 24' is disposed in bearing engagement with a conical slide 32' having a cylindrical base section 34' and a conical section 35'. The apex of the conical section 35' is received in an opening 53' formed in a sleeve 52'. Like the sleeve 52, sleeve 52' is slidably carried within the cylinder 10' with its end opposite the slide 32' being disposed in engagement with the piston head 21'.

Thus, as will be understood, bag 24' bears against the slide 32' to urge said slide into engagement with sleeve 52'. This causes a portion of said sleeve to bear against the cylinder wall and said sleeve to urge the piston 18' to its extended position as illustrated in FIG. 4. When an impact force is applied to the bumper 22' greater than the force exerted by bag 24'. piston 18' will move to the left as viewed in FIG. 4. This causes the bag 24' to partially collapse and the sleeve 52' to scrub against the cylinder wall with the axial extent of the portion 57' engaging the cylinder wall increasing in the manner previously described. When the maximum limit of collapsibility of bag 24' is reached, the sleeve 52' will be forced slightly farther onto the conical section 35' of the slide 32' to thus further increase the scrubbing action of the sleeve against the inner walls of cylinder 10'. Upon release of said force, the components of the mount will reassume their extended positions as illustrated in FIG. 4 under the action of the bag 24'.

In each of the modifications illustrated in the drawings, the inherent resiliency of the material forming the sleeves 52 and 52' will cause said sleeves to reassume their configurations and proportions as illustrated in FIGS. 1 and 4 after an impact force is released. Thus, in each embodiment of the mount illustrated, said mount can be subjected to numerous impact forces without the necessity of any resetting or without creating excessive wear on any of the mount components.

I claim:

1. A shock absorbing mount for an automotive vehicle, comprising a hollow cylinder, a piston carried in said cylinder and projecting outwardly from one end thereof, said piston having a head slidably carried against the inner walls of said cylinder, an inflatable bag carried within said cylinder, an elastomeric sleeve slidably carried in said cylinder with one of its ends engaging said piston head, a slide movably carried against the inner walls of said cylinder and interposed between and engaging said bag and the opposite end of said sleeve, and means on said slide engageable with said sleeve whereby said sleeve is moved outwardly and scrubs against the inner walls of said cylinder when said piston is forced inwardly into said cylinder.

2. A shock absorbing mount as set forth in claim 1 in which said means on said slide comprises a conical section on said slide having its apex received in an opening in said member.

3. A shock absorbing mount as set forth in claim 1 with the addition that means are provided for retaining said slide in engagement with said member.

4. A shock absorbing mount as set forth in claim 3 in which said means comprises a shaft projecting outwardly from said slide through said sleeve into said piston, and biasing means acting on said piston and shaft urging said slide against said sleeve.

5. A shock absorbing mount as set forth in claim 1 in which said elastomeric sleeve has a plurality of radially extending slits formed in its said one end.

6. A shock absorbing mount as set forth in claim 1 in which a seal is disposed around said piston between said head and said one end of said cylinder.

7. A shock absorbing mount as set forth in claim 1 in which an end cap is mounted on said cylinder opposite said one end thereof, and said end cap and piston have mounting means mounted thereon.

8. A shock absorbing mount for an automotive vehicle, comprising a cylinder having an opening at one of its ends and closed at its opposite end by an end cap, a piston carried in said cylinder and projecting outwardly through said opening, said piston having a head slidably carried against the inner walls of said cylinder, a bag carried within said cylinder, said bag having an end wall generally normal to the axis of said cylinder and connected to the bag side walls, means retaining said bag side walls in sealing engagement with the inner walls of said cylinder, an air valve in said end cap in open communication with said bag, and elastomeric sleeve slidably carried in said cylinder with one of its ends engaging said piston head, a slide interposed between and engaging said bag and member, and means on said slide engageable with the opposite end of said sleeve whereby said sleeve is moved outwardly and scrubs against the inner wall of said cylinder when said piston is forced inwardly into said cylinder.

9. A shock absorbing mount for an automotive vehicle comprising a cylinder, a piston carried in said cylinder and projecting outwardly from one end thereof, said piston having a head slidably engaging the inner walls of said cylinder, an inflatable bag carried within said cylinder, an elastomeric sleeve slidably carried in said cylinder with one of its ends in engagement with said piston head, a slide interposed between and in engagement with said bag and the opposite end of said sleeve, said slide having a generally cylindrical base section slidably carried against the inner walls of said cylinder and disposed in abutting engagement with said bag and a generally conical section projecting outwardly from said base section, the apex of said conical section being received in an opening in said sleeve to cause said sleeve to move outwardly and scrub against the inner walls of said cylinder when said piston is forced inwardly into said cylinder.

10. A shock absorbing mount as set forth in claim 9 in which said opening in said sleeve extends axially therethrough.

11. A shock absorbing mount for an automotive vehicle, comprising a cylinder having an opening at one of its ends and closed at its opposite end by an end cap, a piston carried in said cylinder and projecting outwardly through said opening, said piston having a head slidably carried against the inner walls of said cylinder, a bag carried within said cylinder, said bag having an end wall generally normal to the axis of said cylinder and connected to the bag side walls, means retaining said bag side walls in sealing engagement with the inner walls of said cylinder, an air valve in said end cap in open communication with said bag, an elastomeric sleeve slidably carried in said cylinder with one of its ends in engagement with said piston head, a slide having a generally cylindrical base section slidably carried against the inner walls of said cylinder and disposed in abutting engagement with said bag end wall and a generally conical section projecting outwardly from said base section, the apex of said conical section being received in the opposite end of said sleeve to cause said sleeve to move outwardly and scrub against the inner walls of said cylinder when said piston is forced inwardly into said cylinder, a shaft projecting outwardly from the apex of said conical section and slidably carried in said sleeve and piston, a retaining member mounted on said shaft in said piston, and a spring carried on said shaft and bearing against said piston and retaining member to urge said slide into engagement with said sleeve.

* * * * *